United States Patent
Sung et al.

(10) Patent No.: US 7,729,665 B2
(45) Date of Patent: Jun. 1, 2010

(54) DOWN-LINK DATA TRANSMISSION AND RECEIVING SYSTEM AND METHOD OF ARQ IN WIRELESS COMMUNICATION SYSTEM

(75) Inventors: Nak-Woon Sung, Daejeon (KR); Nam-Hoon Park, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom., Inc. (KR)

( * ) Notice: Subject to any disclaimer, the term of this patent is extended or adjusted under 35 U.S.C. 154(b) by 764 days.

(21) Appl. No.: 11/528,994

(22) Filed: Sep. 28, 2006

(65) Prior Publication Data

US 2007/0086367 A1 Apr. 19, 2007

(30) Foreign Application Priority Data

Sep. 28, 2005 (KR) .................. 10-2005-0090349
Nov. 10, 2005 (KR) .................. 10-2005-0107395

(51) Int. Cl.
 *H04B 1/00* (2006.01)
(52) U.S. Cl. .................. 455/69; 455/450; 370/333; 370/349; 714/748
(58) Field of Classification Search ............ 455/69, 455/450, 504–506; 370/333, 349; 714/748
See application file for complete search history.

(56) References Cited

U.S. PATENT DOCUMENTS

2002/0094814 A1* 7/2002 Wigell et al. ............. 455/436
2004/0146033 A1* 7/2004 Soderstrom et al. ....... 370/338
2005/0195822 A1* 9/2005 Lim et al. ................. 370/393

FOREIGN PATENT DOCUMENTS

KR   10-200300017401    3/2003
KR   10-2003-0087882    11/2003
WO   WO 00/62466        10/2000

* cited by examiner

*Primary Examiner*—Nick Corsaro
*Assistant Examiner*—Chuong A Ngo
(74) *Attorney, Agent, or Firm*—The Farrell Law Firm, LLP (57) ABSTRACT

A transmitting/receiving apparatus of down-link data using an automatic repeat request (ARQ) scheme and a method thereof in a wireless communication system is provided. In order to send an ARQ feedback message between a base station and a terminal without a radio resource allocation process in a wireless communication system, when the base station receives down-link data from the terminal of the base station, the base station stores the number list of the transmitted frames and periodically detects the list and automatically allocates radio resources for up-link without an additional process when the list is larger than a predetermined frame. The radio resource allocation request process can be omitted because a radio resource is automatically allocated during the up-link period after the base station transmits the down-link traffic. Thus, the response speed of an ARQ feedback acknowledgement message is enhanced, thereby enhancing a down-link transmission speed.

9 Claims, 9 Drawing Sheets

DOWN-LINK DATA TRANSMISSION AND RECEIVING SYSTEM AND METHOD OF ARQ IN WIRELESS COMMUNICATION SYSTEM

PRIORITY

This application claims priority under 35 U.S.C. §119 to applications entitled "Down-Link Data Transmission and Receiving System and Method of ARQ in Wireless Communication System" filed in the Korean Intellectual Property Office on Sep. 28, 2005 and on Nov. 10, 2005, respectively assigned Ser. No. 10-2005-0090349 and 10-2005-0107395, the contents of which are incorporated herein by reference.

BACKGROUND OF THE INVENTION

1. Field of the Invention

The present invention relates to a transmitting/receiving apparatus of down-link data using an automatic repeat request (ARQ) scheme and method thereof in a wireless communication system. More particularly, the present invention relates to a method for transmitting an ARQ feedback acknowledgement message for down-link traffic from a base station to a terminal.

2. Description of the Related Art

In a wireless communication system, an automatic repeat request (hereinafter, called "ARQ") scheme, that is, an error controlling protocol for requesting a data retransmission when a transmitter or receiver detects a data error generated in a transmission line, includes a selective repeat ARQ scheme for retransmitting only erroneous parts, a cumulative-ARQ, a cumulative with selective-ARQ, and a cumulative with bulk-ARQ scheme. These respective ARQ schemes require an ARQ feedback acknowledgement message indicating whether an ARQ service receiver correctly receives an ARQ block from the ARQ service translator.

A wireless communication system including such an ARQ scheme uses a time division multiple access (TDMA) scheme as a transmission scheme, and it is accordingly configured such that the terminal additionally performs a radio resource allocation request process to the base station so as to transmit up-link data. In addition, general web traffic is asymmetric in that an amount of down-link traffic is very much larger than that of up-link traffic. The down-link traffic relates to traffic transmitted from the base station to the terminal, and the up-link traffic relates to traffic transmitted from the terminal to the base station.

Therefore, a down-link traffic speed among service flows performing ARQ services is considerably dependent on up-link feedback response speed. The reason that a limited size of window is saturated in the case of delaying the update is that the transmitter can transmit the ARQ services only within the ARQ window and an update is performed by the ARQ feedback acknowledgment.

In addition, generally, a wireless communication system for providing a web service uses the TDMA scheme at the down-link for transmitting a large amount of data. Accordingly, there is a problem in that a large delay occurs because the terminal must perform a radio resource allocation process so as to transmit an ARQ feedback response to the up-link.

In addition, because of Internet traffic characteristic, excessive data are transmitted at a predetermined point. When the ARQ service transmitter window receives an ARQ feedback acknowledgement message transmitted from the ARQ service receiver late, it is easy for the ARQ feedback acknowledgement message to exceed the maximum size of the transmitter window. Accordingly, at this time, there is a problem in that the ARQ feedback acknowledgment message is not transmitted to the ARQ service receiver.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for transmitting an ARQ feedback acknowledgement message for down-link having advantages of minimizing a radio resource allocation process and transmitting/receiving down-link data using an ARQ scheme in a wireless communication system.

An exemplary method for transmitting down-link data to a terminal using an automatic repeat request (ARQ) in a wireless communication system according to an embodiment of the present invention includes (a) dividing a down-link SDU (service data unit) into ARQ blocks; (b) generating a PDU (Protocol Data Unit) including the divided ARQ block and transmitting the generated PDU to the terminal; (c) allocating an up-link radio resource to the terminal after a predetermined number of frames are passed; and (d) receiving an ARQ feedback message from the terminal through the up-link radio resource.

Another exemplary method for receiving down-link data from a base station using an automatic repeat request (ARQ) in a wireless communication system according to an embodiment of the present invention includes (a) receiving a PDU (Protocol Data Unit) including an ARQ block from the base station; (b) generating an ARQ feedback acknowledgement message for the received PDU; (c) determining whether an up-link radio resource is allocated from the base station; and (d) transmitting the ARQ feedback acknowledgement message generated at step (b) through the allocated up-link radio resource to the base station when at step (c) it is determined that the up-link radio resource is allocated from the base station.

Another exemplary base station apparatus for transmitting down-link data to a terminal using an automatic repeat request (ARQ) in a wireless communication system according to an embodiment of the present invention includes a connection controller for establishing an ARQ connection with the terminal through a predetermined initial dynamic connection process and establishing initial ARQ parameters and transmitting a DSA (Dynamic Service Addition) to the terminal; a scheduler for requesting the connection controller to transmit the DSA to the terminal and allocating the up-link radio resource to the terminal; an ARQ transmitter for generating a PDU, transmitting the generated PDU to the ARQ receiver of the terminal, receiving an ARQ feedback message, and retransmitting an ARQ block to be transmitted; an ARQ receiver for receiving the ARQ feedback acknowledgement message from the terminal and analyzing the same; a transmission frame number memory for storing an identifier for uniquely discriminating service flows of the terminal and a frame number of the PDU generated so as to transmit a frame; and a frame number comparator for allocating the up-link radio resource to the terminal after the predetermined number of frames based on the frame number stored in the transmission frame number memory after transmitting data through the ARQ transmitter.

BRIEF DESCRIPTION OF THE DRAWINGS

The above and other features and aspects of the present invention will be more clearly understood from the following detailed description taken in conjunction with the accompanying drawings, in which.

DETAILED DESCRIPTION OF THE PREFERRED EMBODIMENTS

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
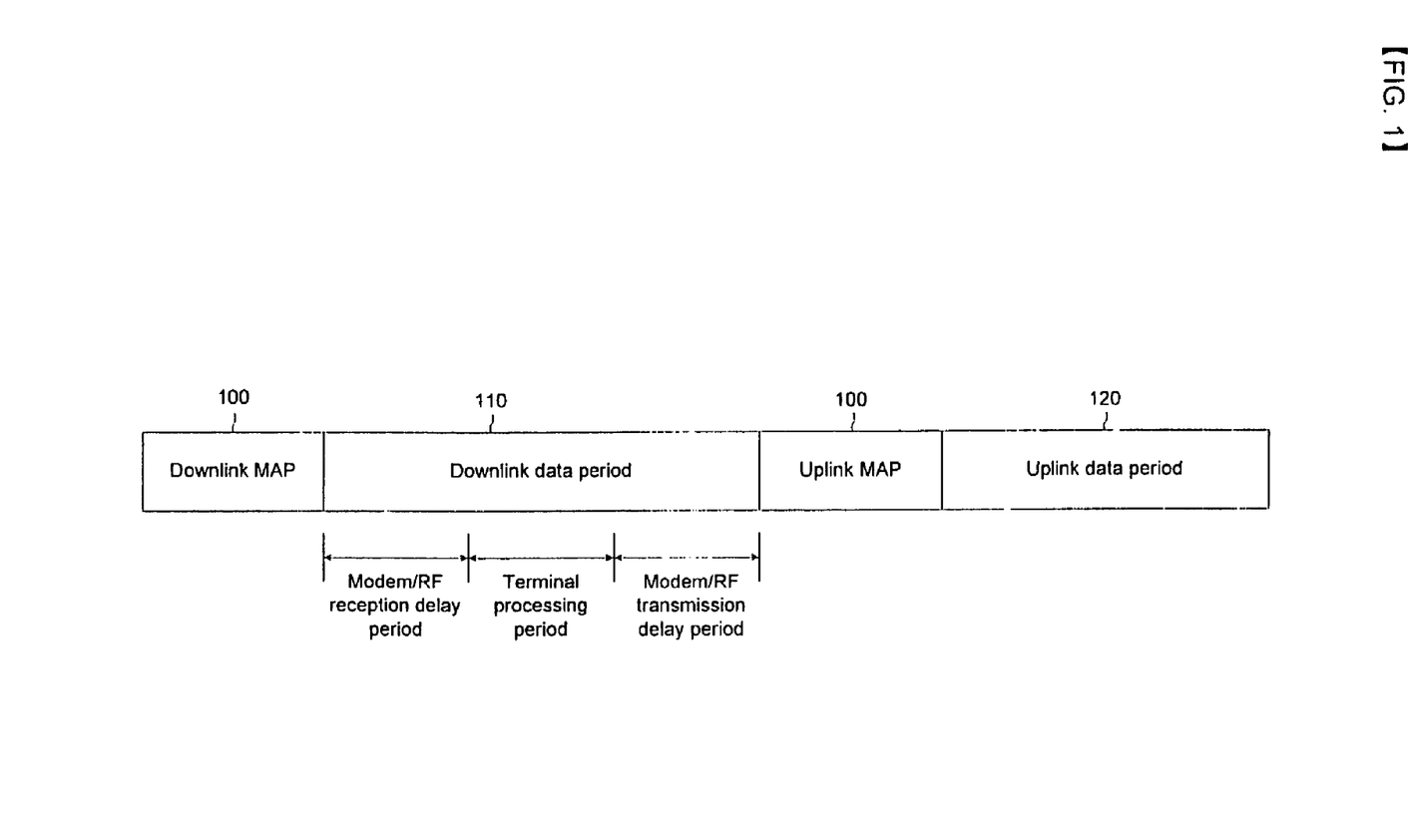
FIG. 1 illustrates a general frame of OFDM/TDMA system.

FIG. 1 illustrates a general frame of an OFDM/TDMA system.

Referring to FIG. 1, the general data frame includes a down-link map 100, a down-link data period 110, a up-link map 120, and an up-link data period 130, and the down-link data period 110 and the up-link data period 130 respectively includes a modem/RF receiving delay time, a terminal processing time, and a modem/RF transmitting delay time. The down-link map 100 and the up-link map 120 manage information for the down-link data period 110 and up-link data period 130, in which data are substantially transmitted.

In the OFDM/TDMA system such as IEEE 802.16, the respective frames of the transmitted data are divided into an up-link data period 130 and a down-link data period 110. A base station 300 (see FIG. 2) transmits data through the down-link data period 110 to a terminal 200 (see FIG. 2), and the respective terminals 200 receive and recognize the corresponding data through map data to be transmitted at the beginning of the respective down-link data periods 110.

In the case of the up-link for transmitting data from the terminal 200 to the base station 300, the terminal 200 checks whether bandwidth (or radio resources) is allocated for the terminal 200 using the map data, and transmits a data frame to the base station 300 during the allocated period on the existence of the bandwidth. At this time, it may be known that the down-link data period 110 is set to be longer than the up-link data period 130 because of the asymmetry of the general web data among an entire data frame period divided into the down-link data period 110 and the up-link data period 130.

Meanwhile, in the TDMA system, the terminal 200 requests the bandwidth whenever there is data to be transmitted from the terminal 200 to the base station 300, and transmits the data frame within an allowance of the base station 300 unlike the data transmission from the base station 300 to the terminal 200.

The ARQ transmission structure generated when a data frame configured in such a structure is transmitted between the terminal 200 and the base station 300 will be described in detail with reference to FIG. 2.

At this time, the selective ARQ scheme among the four types of ARQ schemes defined in the wireless portable Internet system is used. In the selective ARQ scheme, the transmitter transmits an ACK (acknowledgement) message for correctly transmitted ARQ block and a NAK (negative acknowledge) message for erroneous blocks among a series of transmitted ARQ blocks to the receiver, and the receiver retransmits only a NAK block, that is, erroneous ARQ blocks, to the receiver.

Figure 2:
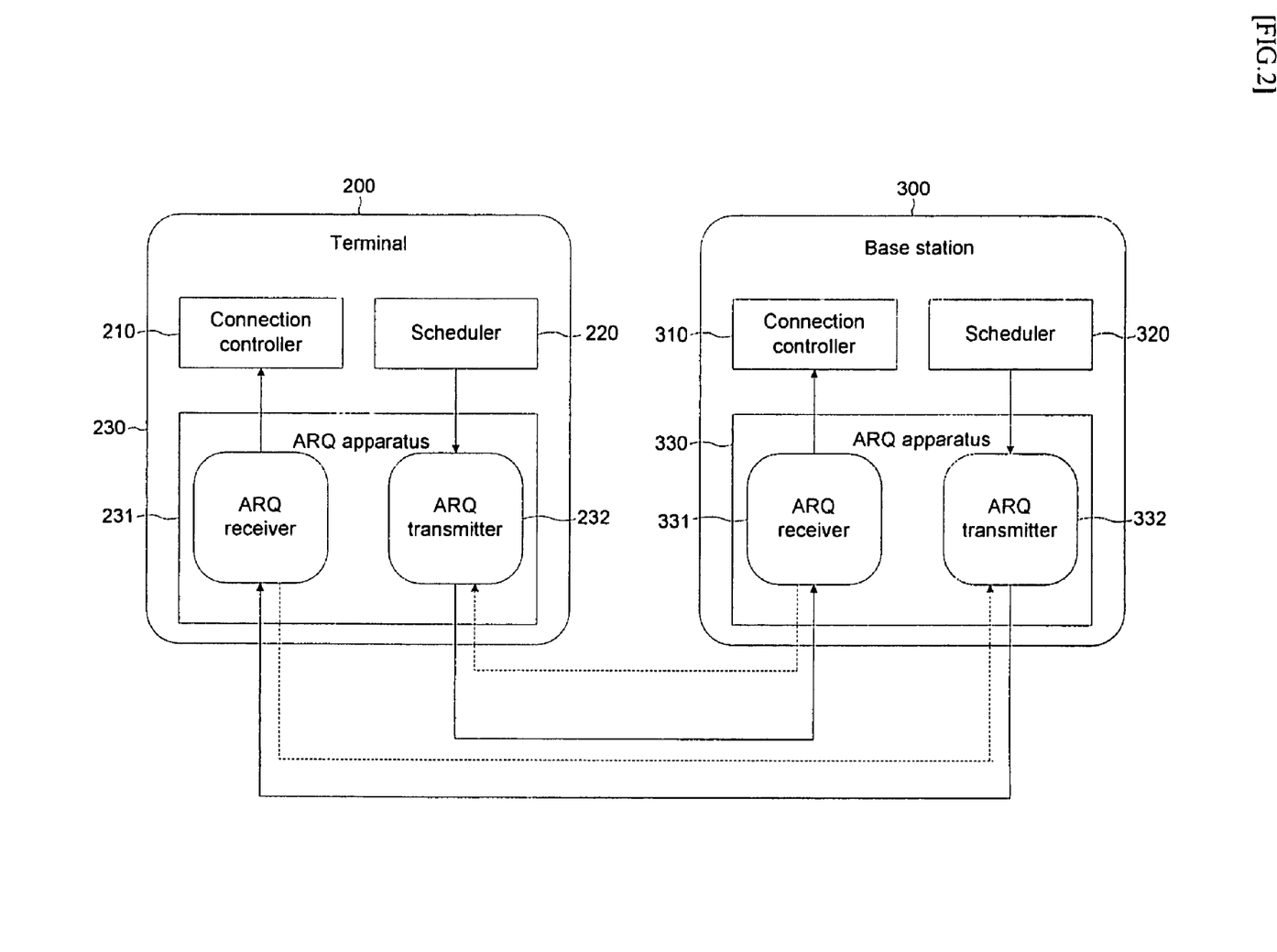
FIG. 2 illustrates a general ARQ transmission between a terminal and a base station.

Referring to FIG. 2, an ARQ transmission structure between the terminal and the base station includes ARQ apparatuses 230 and 330 including connection controllers 210 and 310, schedulers 220 and 320, ARQ receivers 231 and 331, and ARQ transmitters 232 and 332.

The connection controllers 210 and 310 communicate with the base station 300 when a power is applied to the terminal 200 so that the terminal 200 is initialized and a connection is established with the base station 300, and receives agreed ARQ-concerning information, and a dynamic service addition (DSA) process for generating a service flow is performed whenever a new service flow data packet is received from the upper block. At this time, the DSA process is for generating a service flow in the wireless portable Internet system.

The scheduler 320 performs a bandwidth request process for allocating the bandwidth requested from the terminal 200 and provides a service.

Retransmission of the ARQ block is performed for the connections, and the agreement between the terminal 200 and the base station 300 determines a retransmission during the connection establishment/change processes. At this time, the concerned parameters for controlling a retransmission are also included in the connection establishment/change messages.

All data in the connection-determining for performing a retransmission function are formed with the ARQ traffic. The ARQ feedback message for informing that the terminal 200 successfully receives data is transmitted in a media access control (MAC) management message format through a basic management connection to the terminal 200, or is piggy-backed with the other conventional connection to the terminal 200.

In order to control a retransmission, the respective connections have a retransmission control entity at the respective transmitter and receiver. In the case of the connection for supporting up-link traffic, the ARQ transmitter 232 is operated at the terminal 200, and the ARQ receiver 331 is operated at the base station 300. In the case of the connection for supporting up-link traffic, the ARQ receiver 231 is operated at the terminal 200, and the ARQ transmitter 332 is operated at the base station 300.

The scheduler 320 considers an initially fixed ARQ block size for a possible ARQ connection as a unit of the smallest scheduling. Therefore, each service data unit of the base station 300 is divided into the fixed size of ARQ blocks. A media access control protocol data unit (MAC PDU) is generated by the divided ARQ block units and transmitted to the scheduler 320 of the base station 300. The ARQ receivers 231 and 331 of the terminal 200 and the base station 300 extracts the respective ARQ blocks from the transmitted MAC PDU and recombines the extracted ARQ blocks into the SDU and transmits the SDU to the upper layer.

The PDU may be formed with the ARQ block having one PDU header and a plurality of packing subheaders or one fragment subheader and a plurality of ARQ blocks. Generally, the PDU header has 6 bytes, the extended packing subheader has 3 bytes, and the fragment subheader has 2 bytes, and 32 bits of cyclic redundancy checking (CRC) may be added.

Figure 3:
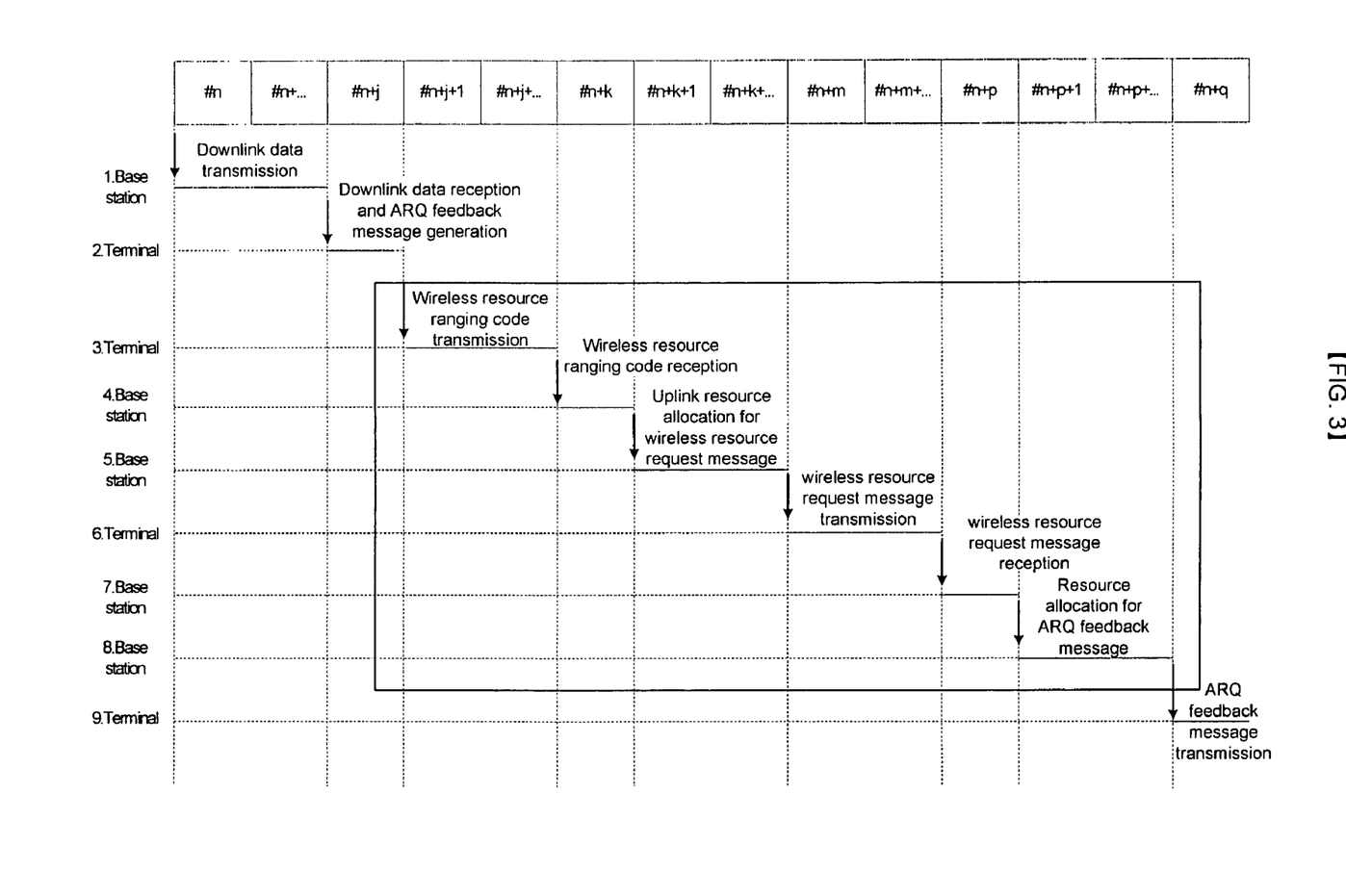
FIG. 3 is a flowchart for showing transmission of down-link data and an up-link ARQ feedback acknowledgement message.
Figure 4:
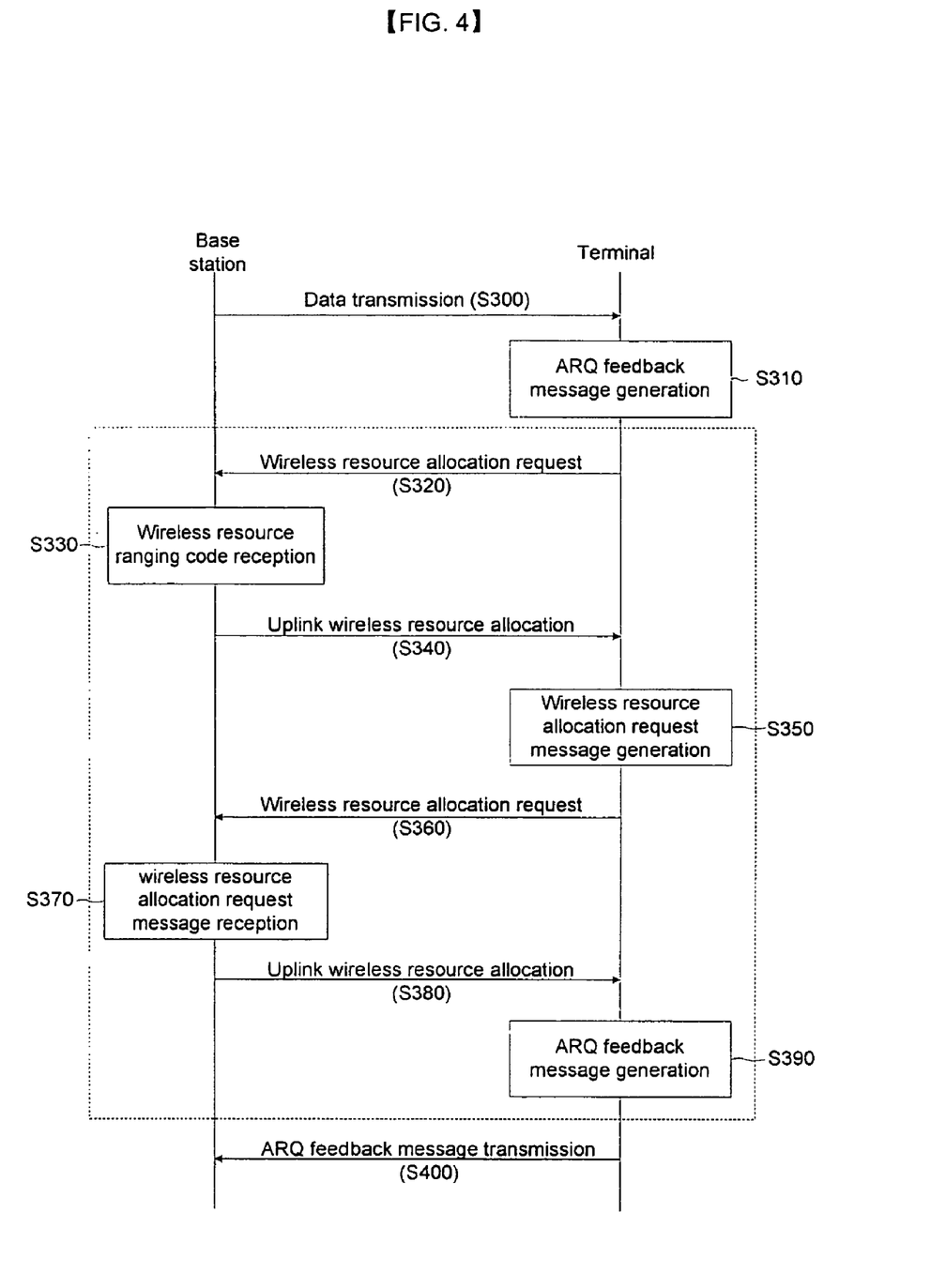
FIG. 4 is a flowchart for showing transmission of down-link data and an up-link ARQ feedback acknowledgement message.

A process for transmitting the down-link data and the up-link ARQ feedback acknowledgement message from the base station 300 to the terminal 200 using the data frame and the ARQ structure shown in FIG. 1 and FIG. 2 will be described in detail with reference to FIG. 3 and FIG. 4. FIG. 3 is a flowchart showing transmission of down-link data and an up-link ARQ feedback acknowledgement message. FIG. 4 is a flowchart showing transmission of down-link data and an up-link ARQ feedback acknowledgement message.

In FIG. 3, processes for transmitting the down-link data and the ARQ feedback acknowledgement message from the base station 300 to the terminal 200 uses a general TDMA scheme. A frame is illustrated in the upper part of FIG. 3, and numbers on the left indicate steps.

At a #n frame of step 1, the base station 300 divides the SDU into a predetermined size of ARQ blocks and transmits the divided SDU to the terminal 200. At a #n+j frame of step 2, the ARQ block data of a predetermined size arrives at the terminal 200. In addition, the terminal 200 generates an ARQ feedback acknowledgement message having an ACK message for the correctly received ARQ block and an NAK message for the erroneously received ARQ block.

At step 3, the terminal 200 performs the radio resource allocation process for transmitting the ARQ feedback acknowledgement message to the base station 300. The radio resource allocation process includes the steps 3 to 8.

Firstly, at a #n+j+1 frame, the radio resource ranging code is transmitted to the terminal 200. Generally, in this process, the random code is transmitted in the radio resource allocation period, and the random code is retransmitted when the random code collides with other terminals. At this time, in a retransmission algorithm, codes are transmitted while multiplicatively increasing a retransmission period thereof so as to reduce a probability of collision with the other terminals.

At the #n+k frame of step 4, the base station 300 receives the codes, and at step 5, the base station 300 allocates the up-link resource for transmitting a radio resource allocation request message (a bandwidth request message) to the #n+k+1 frame. At step 6, the terminal 200 generates the radio resource allocation request message at the #n+m frame and transmits the same to the base station 300. This message has a radio resource size for transmitting the ARQ feedback acknowledgement message.

At the #n+p frame of step 7, the base station 300 receives the radio resource allocation request message from the terminal 200, and at step 8, the base station 300 allocates the up-link radio resource for the ARQ feedback message to the #n+p+1 frame. Finally, at step 9, the terminal 200 transmits the ARQ feedback message.

FIG. 4 is a flowchart showing transmission of down-link data and an up-link ARQ feedback acknowledgement message.

Referring to FIG. 4, the base station 300 transmits the down-link data to the terminal 200 (S300). The down-link data transmits the SDU after dividing it into a predetermined size of ARQ blocks. The terminal 200 receiving the ARQ blocks generates the ARQ feedback acknowledgement message respectively expressed as the ACK message for the correctly received ARQ block and the NAK message for the erroneously received ARQ block (S310).

The terminal 200 performs the radio resource allocation process so as to transmit the ARQ feedback acknowledgement message generated at step S310 to the base station 300. First, the terminal 200 transmits the radio resource ranging code to the base station 300 so as to request the radio resource allocation (S320). The step for transmitting the radio resource allocation request includes transmitting a random code during the radio resource allocation period, and retransmitting the random code when it collides with other terminals. At this time, the retransmission algorithm, that is, a back-off process algorithm, multiplicatively increases a retransmission period and transmits the radio resource ranging code to the base station 300 so as to reduce a probability of collision with other terminals.

The base station 300 receives the radio resource ranging code (S330), and allocates the up-link radio resource to the terminal 200 so as to transmit the radio resource allocation request message (S340). The terminal having the allocated up-link radio resource generates the radio resource allocation request message (S350) and transmits the same to the base station 300. At this time, the transmitted radio resource allocation request message includes the radio resource size information for transmitting the ARQ feedback acknowledgement message.

The terminal 200 requests the radio resource allocation (S360), and the base station 300 receives the radio resource allocation request message from the terminal 200 (S370) and allocates the up-link radio resource to the terminal 200 so as to transmit the ARQ feedback message to the terminal 200 (S380). The terminal 200 having the allocated up-link radio resource generates the ARQ feedback message (S390) and transmits the ARQ feedback message to the base station 300 (S400).

As described above, in order for the terminal to receive the ARQ feedback acknowledgement message for the down-link data transmitted from the base station 300, at least 9 steps (at this time, the steps S350 and S360, and the steps S390 and S400, are referred to as one step) are required. Accordingly, when one step is assumed as one frame, at least 9 frames are required. Generally, a time for transmitting the ARQ feedback acknowledgement message to the base station 300 is given as Equation 1, as follows:

$$T = \text{Frame Duration} * q \quad (1)$$

At this time, the frame duration is defined as a period of one frame of TDMA, and is defined as 2 ms, 2.5 ms, 4.5 ms, 8 ms, 10 ms, or 12 ms in the portable Internet system. q is given as the frame described in FIG. 3.

In FIG. 4, assuming that at least 9 frames are used to transmit the ARQ feedback acknowledgement message to the base station 300 (q=9) and one frame is given as 5 ms, it takes at least 45 ms to transmit the ARQ feedback acknowledgement message to the base station 300.

Therefore, when almost all of the user traffic is assumed to be web traffic, and the web traffic includes almost all the down-link data from the base station 300 to the terminal 200, data cannot be transmitted to the down-link regardless of the sufficient amount of the down-link resource. This is because the ARQ transmitter 332 of the base station 300 can only transmit the ARQ block within the ARQ window according to the ARQ mechanism, that is, it cannot transmit the ARQ block regardless of the sufficient down-link resource when the up-link ARQ feedback acknowledgement message is delayed.

Therefore, according to the exemplary embodiment of the present invention, a structure and process for transmitting the ARQ feedback acknowledgement shown in FIG. 5 to FIG. 8 are provided so as to minimize the conventional radio resource allocation process.

Figure 5:
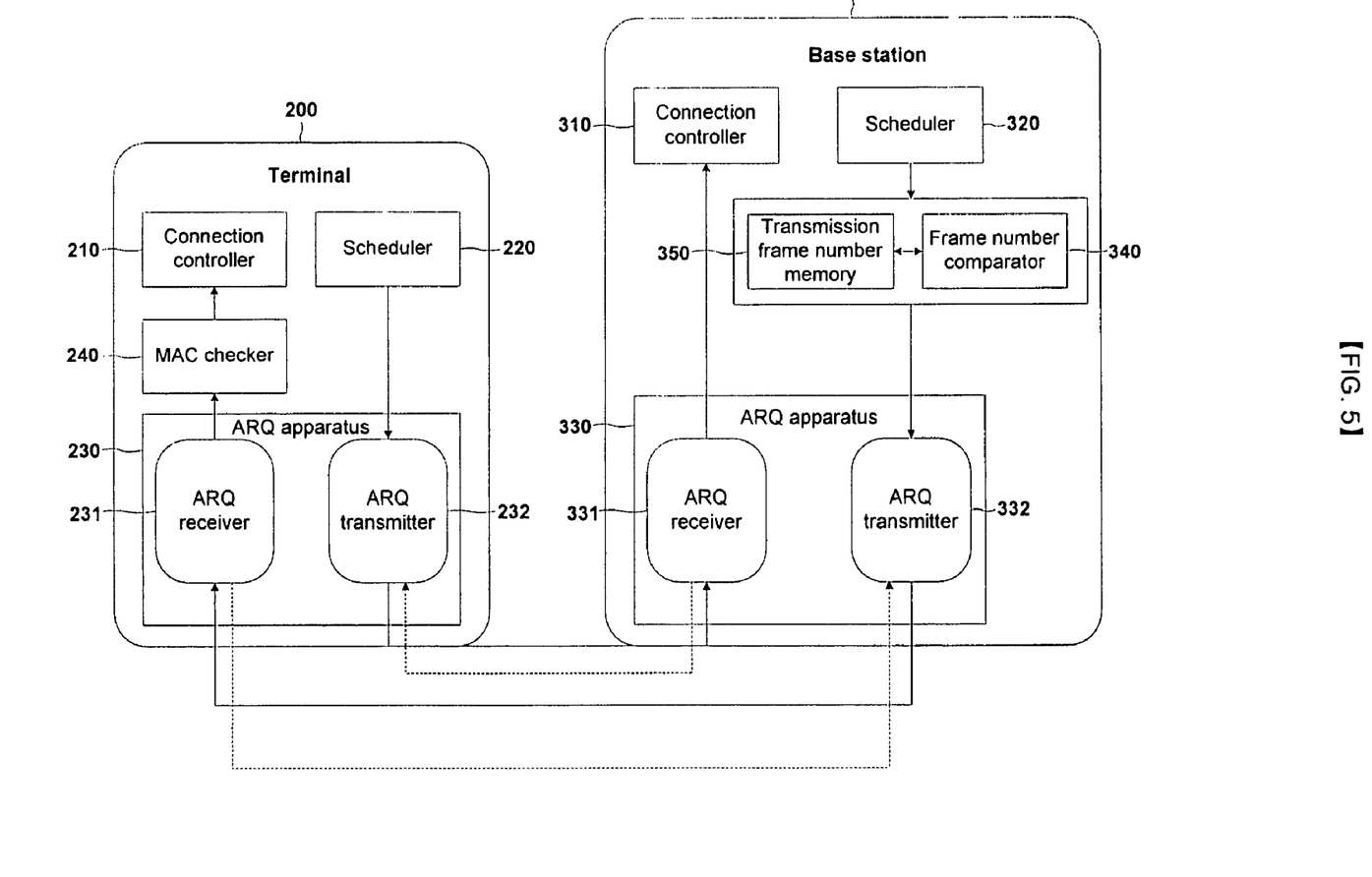
FIG. 5 shows an ARQ transmission between a terminal and a base station according to an exemplary embodiment of the present invention.

FIG. 5 shows an ARQ transmission between a terminal and a base station according to an exemplary embodiment of the present invention.

Referring to FIG. 5, a main structure for transmitting the ARQ between the terminal 200 and the base station 300 had been described in detail in FIG. 2. According to the exemplary embodiment of the present invention, in order to transmit the ARQ, the base station 300 includes a transmission frame number memory 350 and a frame number comparator 340 below the scheduler 320, and the terminal 200 includes a MAC checker 240 below the connection controller 210.

The transmission frame number memory 350 stores a set of connection identifiers (CID; identification number) and the transmission frame number for discriminating the terminal 200 and the corresponding service flow. At this time, the transmission frame number is given as a transmission frame number of the data frame to be transmitted from the base station 300 to the terminal 200 when the scheduler 320 of the base station 300 compares the present window size and the maximum window size and determines whether the present window size is greater than the maximum window size.

The frame number comparator 340 compares the frame number at the point of assuming that the base station 300 has generated the frame number and the ARQ feedback acknowledgement message. In such a comparison manner, it is determined to allocate a radio resource for transmitting the ARQ feedback acknowledgement message to the terminal 200.

The MAC checker 240 checks the point at which the generated ARQ feedback acknowledgement message for the received ARQ block will be transmitted to the base station 300. That is, the MAC checker 240 receives the set of the transmission frame number and the CID of the destination of the ARQ block included in the forward MAC header of the broadcasted ARQ block, and transmits the ARQ feedback acknowledgement message to the base station 300 when the corresponding MAC header includes the corresponding CID.

The MAC checker 240 performs such functions so that the terminal 200 may not transmit the radio resource allocation request message to the base station 300. Accordingly, unnecessary processes for awaiting a radio resource allocation request acknowledgement message from the base station 300 may be omitted.

A flowchart of the ARQ feedback acknowledgement process including the transmission frame number memory 350 and the frame number comparator 340 will be described in detail with reference to FIG. 6.

Figure 6:
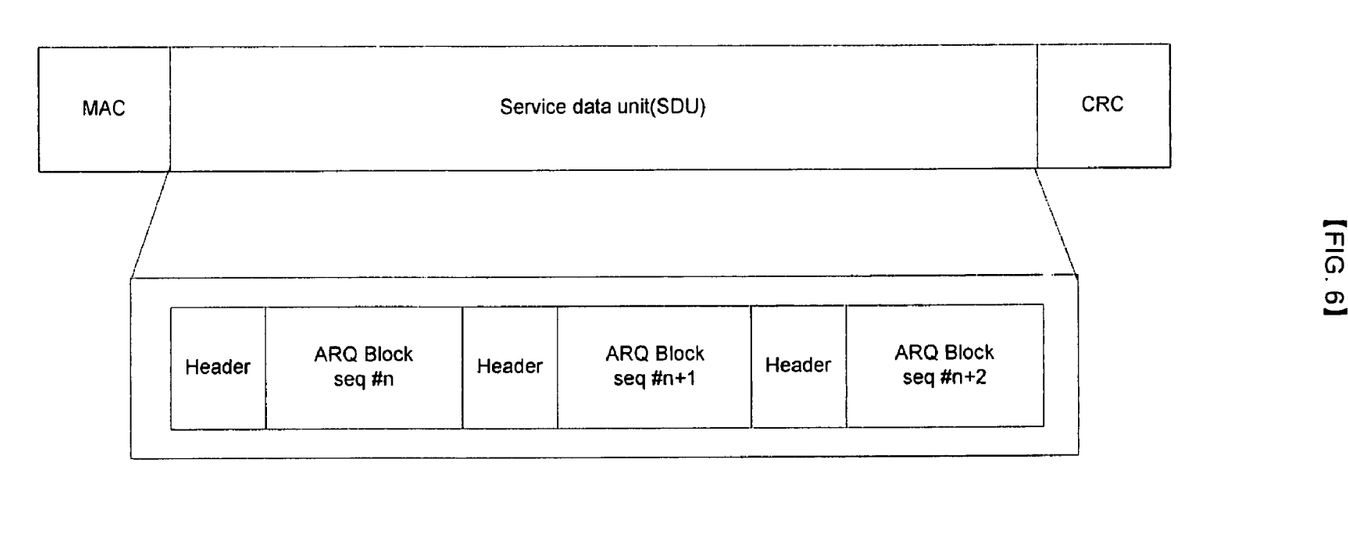
FIG. 6 illustrates a frame for an ARQ feedback acknowledgement according to an exemplary embodiment of the present invention.

FIG. 6 illustrates a frame for an ARQ feedback acknowledgement according to an exemplary embodiment of the present invention.

In FIG. 6, the SDU moves data from the upper layer to the lower layer, and the ARQ transmitter 332 of the base station 300 divides the SDU into a plurality of ARQ blocks. A header and a series of transmission frame numbers are allocated to the respective blocks so as to discriminate the respective blocks. When the divided ARQ blocks are transmitted, the MAC header and the CRC are transmitted while added at the front and rear of the entire block. At this time, the series of numbers are allocated in the same format as "transmission frame number #n", which indicates the ARQ block transmitted at the n-th frame.

Figure 7:
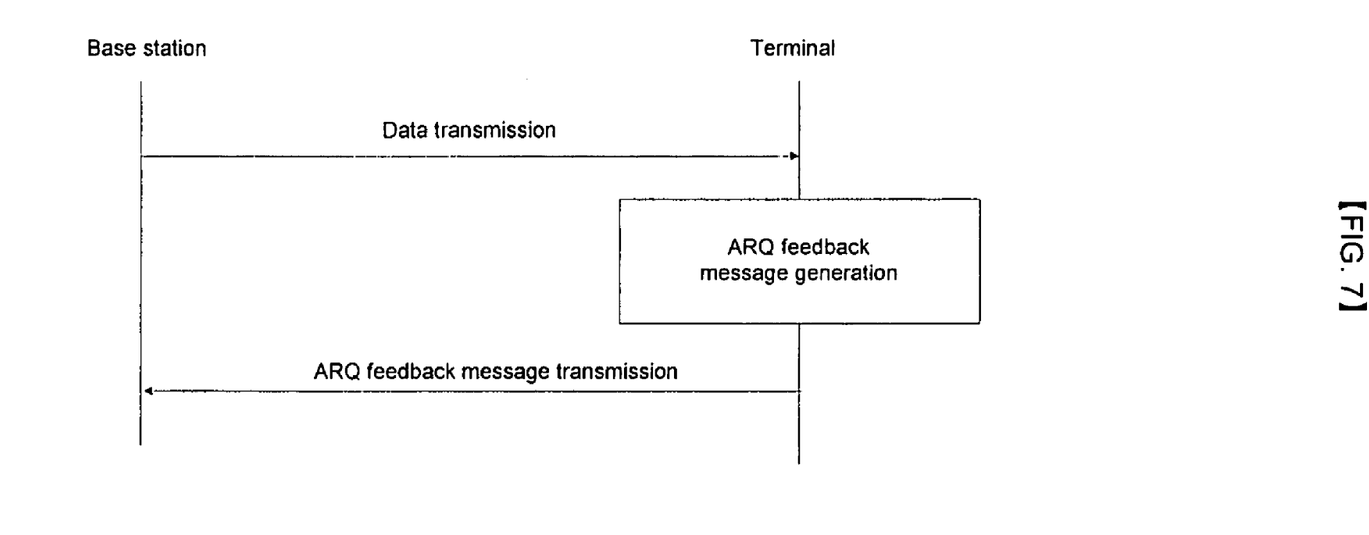
FIG. 7 is a flowchart for showing transmission of down-link data and an up-link ARQ feedback acknowledgement message according to an exemplary embodiment of the present invention.

FIG. 7 is a flowchart for showing transmission of down-link data and an up-link ARQ feedback acknowledgement message according to an exemplary embodiment of the present invention.

The base station 300 divides the down-link data into a predetermined size of ARQ blocks and transmits the divided down-link data to the terminal 200. The terminal 200 receives the ARQ blocks and generates the ARQ feedbacks acknowledgement message expressed as an ACK message for a correctly received ARQ block and expressed as a NAK message for an erroneously received ARQ block.

The terminal 200 transmits the generated ARQ feedback acknowledgement message to the base station 300. In this case, the generated ARQ feedback acknowledgement message may be transmitted to the base station 300 without the radio resource allocation request process, rather than the terminal 200 requesting the radio resource allocation to the base station and the base station 300 responding to the radio resource allocation request message and then the terminal performing the radio resource allocation as shown in FIG. 3.

This is because that the scheduler 320 of the base station 300 is mainly involved with the down-link data transmission and up-link radio resource allocation from the base station 300 to the terminal 200. That is, this is because the up-link radio resource is automatically allocated from the base station 300 such that the terminal can transmit the ARQ feedback acknowledgement message to the base station 300 whenever the number of frames exceeds a predetermined value.

Figure 8:
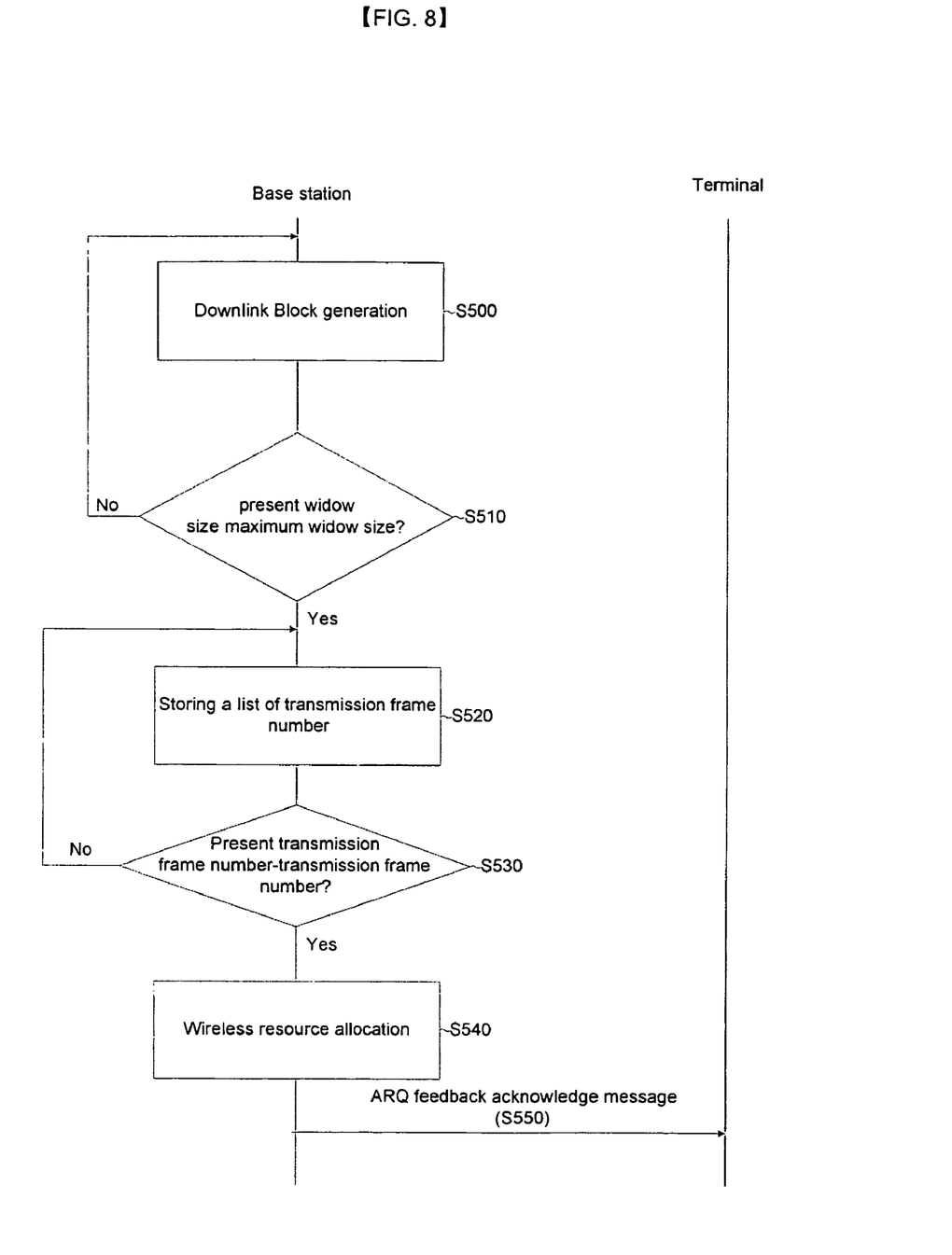
FIG. 8 is a flowchart for showing transmission of an ARQ feedback acknowledgement message according to an exemplary embodiment of the present invention.

The process for transmitting the ARQ feedback acknowledgement message without the radio resource allocation request process shown in FIG. 7 will be described in detail with reference to FIG. 8. FIG. 8 is a flowchart for transmitting an ARQ feedback acknowledgement message according to an exemplary embodiment of the present invention.

In the wireless portable Internet system, the scheduler 320 of the base station 300 is mainly involved with the down-link data transmission and up-link radio resource allocation from the base station 300 to the terminal 200. In addition, the respective down-link data, the ARQ blocks generated at the ARQ transmitter 332 of the base station 300, may be deleted from a queue or may be retransmitted when the ARQ feedback message is received from the terminal 200.

As shown in FIG. 8, when the base station 300 generates the down-link ARQ block (S500), the present window size is compared with the maximum window size (S510). When the present window size is greater than the maximum window size, the down-link ARQ block generating process (S500) continuously returns, and when the present window size is less than the maximum window size, the scheduler 320 of the base station 300 transmits ARQ block to the terminal 200.

At this time, the scheduler 320 stores the transmission frame number at the transmission frame number memory 350 whenever the respective ARQ blocks are transmitted to the terminal 200 (S520). The constituent elements of the transmission frame number list is a set of the CID and the transmission frame number for discriminating the corresponding terminal 200 and the corresponding service flow, the transmission frame number corresponding to the transmission frame allocated when ARQ blocks are divided at the ARQ transmitter 332.

The transmission frame number has the format {CID, transmission frame number#}. The CID implies a unique identifier for discriminating the service flow between the terminal 200 and the base station 300, for example it may be the telephone number of the terminal 200, and the transmission frame number# implies the frame number having transmitted the MAC PDU including the present ARQ block. As such, the scheduler 320 of the base station 300 searches the transmission frame number list stored at the frame number memory 35, and whenever Equation 2 is satisfied (S530) it allocates the radio resource such that the ARQ feedback acknowledgement message is transmitted to the terminal 200 having the corresponding CID in the up-link (S540).

Equation 2:

$$\text{The present transmission frame number\#} - \text{transmission frame number\#} > R \quad (2)$$

In Equation 2, the present transmission frame number# implies a number of the present frame for searching the transmission frame number list stored at the transmission frame number memory 350, and the transmission frame number# implies an transmission frame number#, that is, an attribute of {CID, transmission frame number#} stored at the transmission frame number list. In addition, R is a time point assumed that the ARQ feedback acknowledgement message had been generated in a predetermined terminal 200 of the present wireless portable Internet system, and has a unit of fame number.

The base station 300 allocates radio resources capable of transmitting the ARQ feedback acknowledgement message to the corresponding terminal in Equation 2, whenever "the present transmission frame number#–transmission frame number#" is greater than R. That is, the scheduler 320 of the base station 300 allocates the up-link resource for transmitting the feedback acknowledgement message after R frame for the respective generated down-link data without additional radio resource allocation process.

For example, a number of a frame to be presently transmitted is given as 13, a number of a frame stored longest at the transmission frame number memory 350 is given as 1, and when R is 12, "present transmission frame number#–transmission frame number#" is given as 12 by Equation 2. Since the "present transmission frame number#–transmission frame number#" next to the presently transmitted frame is greater than R, the down-link data are generated and transmitted while included in a message expressing that the radio resource for up-link has been allocated to the terminal corresponding to the transmission number 1, so as to receive the ARQ feedback acknowledgement message of the terminal corresponding to the transmission frame number 1 when the ARQ block is transmitted to the terminal 200 (S550).

At this time, the amount of the resource allocated for the respective up-links is set to be greater than 17 bytes, which is the sum of 7 bytes for the minimum ARQ feedback IE (Information Element) and 10 bytes including 6 bytes of the PDU header and 32 bits of CRC provided in the description of FIG. 4. By such processes, the delay due to the radio resource allocation may be minimized.

Figure 9:
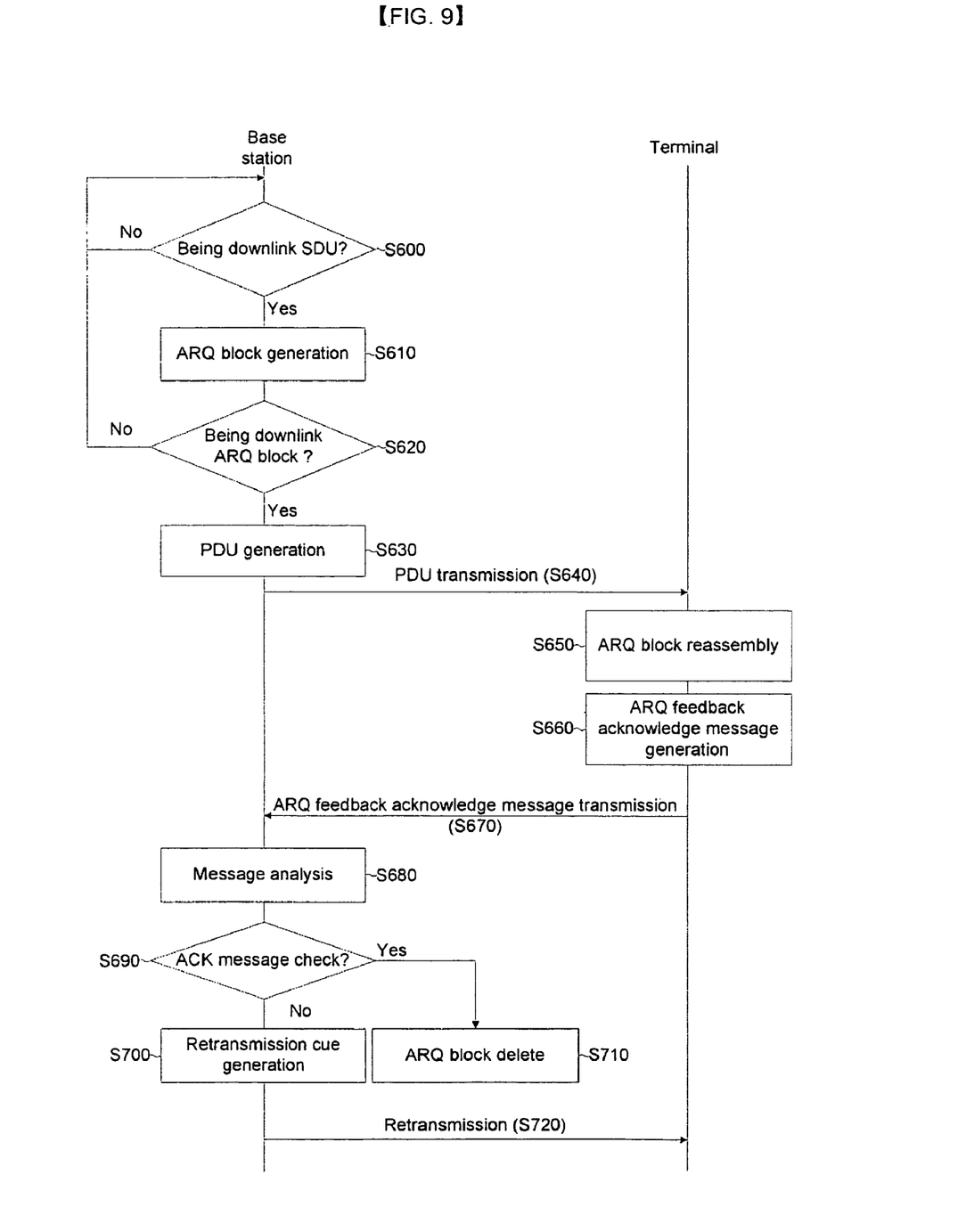
FIG. 9 is a flowchart for showing transmission of an ARQ feedback acknowledgement message according to an exemplary embodiment of the present invention.

FIG. 9 is a flowchart showing an ARQ feedback response transmission according to an exemplary embodiment of the present invention.

Referring to FIG. 9, the ARQ transmitter 322 of the base station 300 detects the existence of the down-link SDU from the external network (S600), and when the SDU is found, the SDU is divided into the predetermined size of ARQ blocks and the ARQ block is generated (S610). The scheduler of the base station 300 scheduler 320 determines whether the ARQ block divided by the ARQ transmitter 332 is given as the down-link ARQ block (S620), and when the down-link radio resource is included and the transmission ARQ window size is not exceeded, the MAC PDU is generated (S630) and transmitted to the terminal 200 (S640) and the transmitted ARQ block is stored at the queue included in the ARQ transmitter 332 of the base station 300.

The terminal 200 receives the MAC PDU including the ARQ block from the base station 300 and performs the CRC check and determines whether the received MAC PDU has an error. When the received MAC PDU has an error, the received MAC PDU is discarded, and when the received MAC PDU has no error, the received MAC PDU is transmitted to the ARQ receiver of the terminal 200. The ARQ receiver 231 of the terminal 200 performs a reassembly task using the received ARQ block (S650), generates the SDU, and transmits the generated SDU to the upper layer.

Meanwhile, the ARQ receiver 231 of the terminal 200 generates an ARQ feedback acknowledgement message as ACK for the ARQ blocks received in the range of the received ARQ window, and as NAK for the ARQ blocks not received in the range of the received ARQ window (S660). At the same time, the scheduler 320 of the base station 300 allocates the up-link resource for transmitting the ARQ feedback acknowledgement message to the terminal 200 although the terminal 200 performs no radio resource allocation after the R frame referred to in FIG. 8. The terminal 200 makes the ARQ feedback acknowledgement message into the MAC PDU through the allocated up-link resource and transmits the same to the base station 300 (S670).

The ARQ receiver 331 of the base station 300 receives the MAC PDU made from the ARQ feedback acknowledgement message, analyzes the ARQ feedback acknowledgement message (S680), and confirms whether the corresponding block is correctly transmitted to the terminal 200 (S690). When a bit of the ARQ feedback acknowledgement message for the corresponding block is given as ACK, the base station 300 deletes the ARQ block stored at the queue of the ARQ transmitter 332 (S710), and when the bit of the ARQ feedback acknowledgement message is given as NAK, a retransmission queue is generated (S700), stored, and retransmitted to the terminal 200 (S720).

The present invention may include a program for realizing the corresponding function according to an exemplary embodiment of the present invention or a recording medium storing the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to above exemplary embodiments, the radio resource allocation request process can be omitted because a radio resource is automatically allocated during the up-link period after the base station transmits the down-link traffic. Thus, the response speed of the ARQ feedback acknowledgement message is enhanced, thereby enhancing a down-link transmission speed.

In addition, the feedback message acknowledgements are quickly transmitted to the base station even when excess down-link data are transmitted to the specific system in the wireless portable Internet system. Thus, a probability for data not to be transmitted can be minimized because the window of the ARQ transmitter of the base station is maximized.

What is claimed is:

1. A method for a base station to transmit downlink data to a terminal using an automatic repeat request (ARQ) in a wireless communication system, comprising:
   (a) dividing a down-link SDU (service data unit) into ARQ blocks;
   (b) generating a PDU (Protocol Data Unit) including a divided ARQ block and transmitting the generated PDU to the terminal;
   (c) storing a number of a frame having transmitted the PDU including the divided ARQ block to the terminal;
   (d) allocating an uplink radio resource to the terminal after it is determined that a predetermined number of frames have passed based on the stored number of the frame, comprising:
      determining whether a difference between the frame number of the PDU transmitted to the terminal and the stored frame number is greater than the predetermined number of the frame;
      determining that a predetermined number of frames have passed when the difference is greater than the predetermined number of the frame; and
   (e) receiving an ARQ feedback message from the terminal through the up-link radio resource.

2. The transmitting method of claim 1, wherein at step (d), the predetermined number of frames is greater than a time used when the terminal having received the PDU at step (b) generates the ARQ feedback acknowledgement message corresponding to the PDU including the ARQ block.

3. The transmitting method of claim 1, wherein step (c) further includes storing the identification number of the terminal having received the PDU.

4. The transmitting method of claim 1, wherein at step (b), the ARQ block is generated as the PDU when a window of the ARQ is smaller than a maximum window.

5. The transmitting method of claim 1, comprising, after step (e): analyzing the ARQ feedback message received from the terminal; and deleting the ARQ block for the ARQ block having no error in the ARQ feedback message.

6. The transmitting method of claim 5, comprising inserting the ARQ block into a retransmission queue having an error in the ARQ feedback message, and retransmitting the ARQ block.

7. A base station apparatus for transmitting down-link data to a terminal using an automatic repeat request (ARQ) in a wireless communication system, comprising:
   a connection controller for establishing an ARQ connection with the terminal through a predetermined initial dynamic connection process and establishing initial ARQ parameters and transmitting a DSA (dynamic service addition) to the terminal;
   a scheduler for requesting the connection controller to transmit the DSA to the terminal and allocating the uplink radio resource to the terminal;
   an ARQ transmitter for generating a PDU, transmitting the generated PDU to the ARQ receiver of the terminal, receiving an ARQ feedback message, and retransmitting an ARQ block to be transmitted;
   an ARQ receiver for receiving the ARQ feedback acknowledgement message from the terminal and analyzing the same;
   a transmission frame number memory for storing an identifier for uniquely discriminating service flow of the terminal and a frame number of the PDU generated for frame transmission; and
   a frame number comparator for allocating the up-link radio resource to the terminal after a predetermined number of frames based on the frame number of the PDU stored at the transmission frame number memory after transmitting data through the ARQ transmitter.

8. The base station apparatus of claim 7, wherein the frame number comparator allocates the uplink radio resource to the terminal when the difference between one transmission frame number and another transmission frame number is greater than the predetermined frame number, the one frame number corresponding to a frame to be presently transmitted and the other frame number corresponding to a frame previously transmitted through the ARQ transmitter.

9. The base station apparatus of claim 7, wherein the transmission frame number memory stores the identifiers and transmission frame numbers in a format of a set of a CID and the transmission frame number.

* * * * *